United States Patent [19]
Murray et al.

[11] Patent Number: 5,191,480
[45] Date of Patent: Mar. 2, 1993

[54] OPTICAL ACCESSORY FOR DIGITIZER CURSORS

[75] Inventors: Wayne J. Murray, Bridgeport; David Siefer, Orange; George Hesse, Naugatuck, all of Conn.

[73] Assignee: Summagraphics Corporation, Seymour, Conn.

[21] Appl. No.: 436,197

[22] Filed: Nov. 13, 1989

[51] Int. Cl.$^5$ .................... G02B 7/02; G02B 27/02; G09G 3/02

[52] U.S. Cl. .................... 359/808; 359/805; 359/809; 340/710

[58] Field of Search .................... 350/243–250; 33/1 M, 18.1, 488; 178/18–20; 359/798–819, 896, 827; 340/709, 710

[56] References Cited

U.S. PATENT DOCUMENTS

| | | | |
|---|---|---|---|
| 1,424,848 | 8/1922 | Paddison | 359/802 |
| 1,806,422 | 5/1931 | Shaen | 350/116 |
| 1,900,332 | 3/1933 | Cordadi et al. | 33/488 |
| 1,933,880 | 11/1933 | Tihenko | 350/244 |
| 1,971,519 | 8/1934 | Bradford | 350/244 |
| 2,087,081 | 7/1937 | Bock | 359/800 |
| 2,312,488 | 3/1943 | Rowland | 350/244 |
| 2,767,612 | 10/1956 | Hofer | 359/819 |
| 3,655,960 | 4/1972 | Andree | 350/244 |
| 3,828,991 | 8/1974 | Moore | 359/808 |
| 4,561,183 | 12/1985 | Shores | 33/1 M |
| 4,575,581 | 3/1986 | Langberg | 178/18 |
| 4,639,547 | 1/1987 | Jacob-Grinschgl et al. | 178/18 |
| 4,693,554 | 9/1987 | Cordes | 350/244 |
| 4,707,572 | 11/1987 | Kable et al. | 178/18 |
| 4,786,892 | 11/1988 | Kuso et al. | 178/18 |
| 4,859,032 | 8/1989 | Feinbloom | 359/802 |
| 4,922,060 | 5/1990 | McJunkin | 178/18 |
| 5,014,044 | 5/1991 | Murray | 340/710 |

FOREIGN PATENT DOCUMENTS 17185 6/1898 Switzerland.

OTHER PUBLICATIONS

J. Titus; "Digitizing tablets offer choices of formats, operating modes, and pointers", Apr. 1986, pp. 69–72, 74, E.D.N. Electrical Design News, vol. 31, No. 8.
T. A. Nobbe; "Graphic-input devices for CAD/CAM", Feb. 1985, pp. 106–110, Machine Design, vol. 57, No. 4.
Advertisement of Summagraphics Corporation for Microgrid II Series, (Form No. 181, Rev. D, Mar. 1988).
Advertisement of Summagraphics Corporation for The Intelligent Digitizer (Form 380 10K).

Primary Examiner—Bruce Y. Arnold
Assistant Examiner—Thong Nguyen
Attorney, Agent, or Firm—Rosen, Dainow & Jacobs

[57] ABSTRACT

An accessory for improving the accuracy, and/or facilitating the use, and/or improving aesthetics and/or ergonomics of digitizer cursors is disclosed. The accessory mounts an optical element to the position-sighting aperture on the cursor. In all embodiments, the accessory or accessories may be completely and easily removed from the cursor (and replaced). Optical elements may be interchanged and combined so as to permit the operator to select optics that are most efficient for a particular digitizer task. In particular embodiments, the lens is mounted directly to the position-sighting aperture or to another member which is directly mounted to the position sighting aperture. In some embodiments, the optical element is pivotally mounted so that it can be moved into and out of the operator's line of sight. This allows the operator to move the optical element out of his line of sight to the position-sighting aperture without removing the optical element from the cursor.

3 Claims, 4 Drawing Sheets

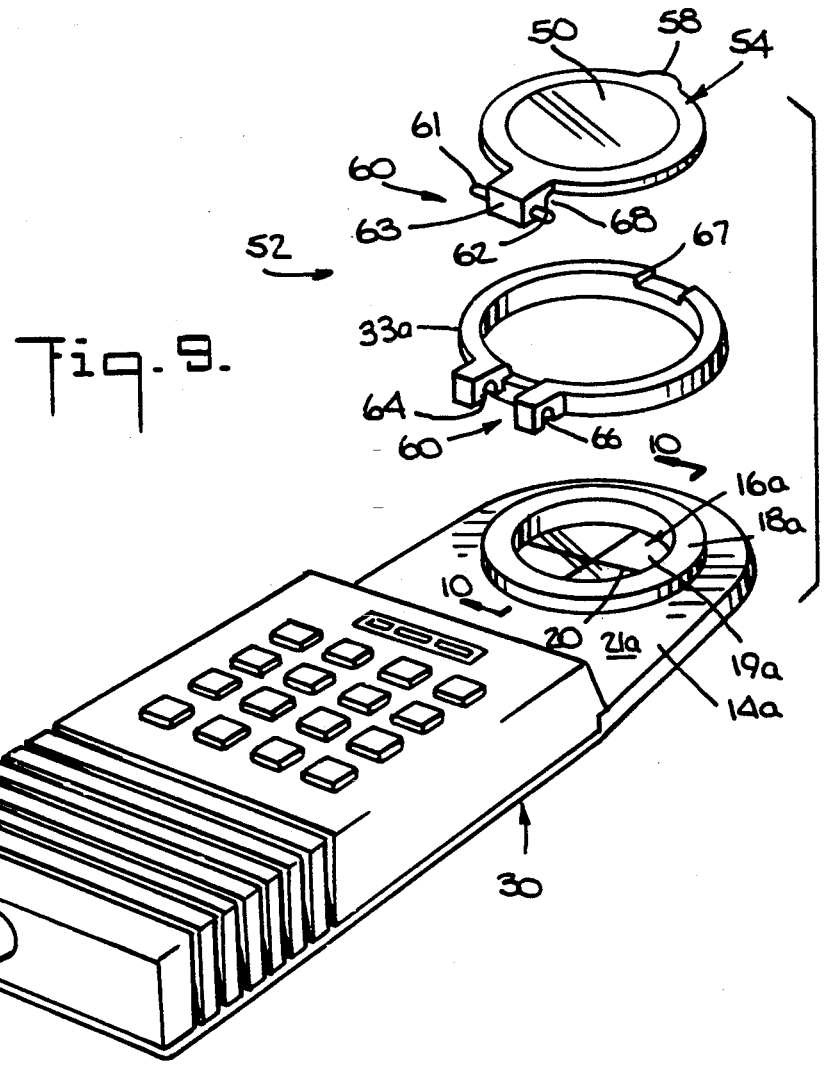
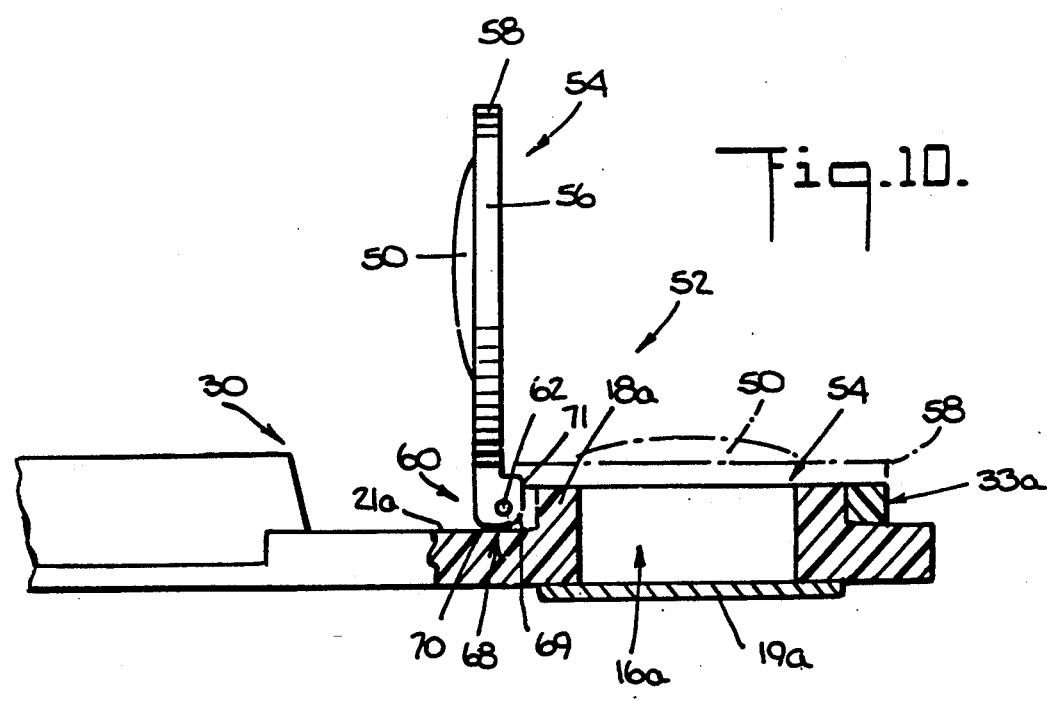

OPTICAL ACCESSORY FOR DIGITIZER CURSORS

BACKGROUND OF THE INVENTION

The present invention relates generally to facilitating and/or improving use of a digitizer cursor and, more particularly, to improving the accuracy of positioning a digitizer cursor. More particularly, the invention relates to a movably-mounted optical accessory used by the operator to more accurately make position determinations of the digitizer cursor.

Digitizers generally include a manually movable cursor and tablet having a planar sensing surface. A sheet bearing a two-dimensional design such as a graphic illustration, technical drawing, etc., is placed on the sensing surface of the tablet and an operator manually moves the cursor on the surface of the sheet to trace selected features of the design. Cross-hairs in a position-sighting aperture of the cursor may be used to align the cursor with a desired feature of the design.

The operator, by pressing a button on the cursor, may direct a computer connected to the digitizer to perform a particular operation based on the coordinates relative to the tablet of a particular point on the sheet below the cross-hairs. The coordinates of that particular point may then be used by the computer in accordance with a software program, e.g., a computer-aided design program (CAD). The position coordinates of the desired feature are determined by an interaction between, for example, inductive or capacitive elements in the digitizing tablet and the cursor.

Operator error in determining the proper position for the cursor is frequently a significant limitation on digitizer accuracy rather than the resolution or the accuracy provided by the digitizer. Magnification of the details of the design may assist the operator in correctly positioning the cursor. However, a magnifying lens carried by a cursor to provide such desired magnification may interfere with use of the cursor when such magnification is not needed. For example, the magnifying lens restricts the operator's field of view in the area of the position-sighting aperture, and may interfere with the operator's ability to quickly recognize and locate desired details. Thus, while it may be desirable to magnify a surface below the cross-hairs to precisely position the cursor, it may also be desirable at other times to provide a clear line of sight for the operator to the position-sensing aperture.

A magnifier and holder for the magnifier which removably attaches to a cursor is currently available from Summagraphics Corporation, the assignee of this application. Co-pending U.S. patent application Ser. No. 199,674, filed May 27, 1988, of Murray, assigned to the assignee of this application, now U.S. Pat. No. 5,014,044 discloses a cursor having a magnifier which may be moved out of the position-sighting aperture line of sight, and which may be removed from the cursor. While in the application referred to above and in the device referred to above the magnifier may be moved out of the line of sight of the position-sighting aperture, and in the device referred to above the holder may be removed from the cursor, there is room for improvement, functionally, operationally, and/or aesthetically, in achieving magnification while providing for moving the magnifier out position-sighting aperture line of sight and removing the magnifier.

SUMMARY OF THE INVENTION

An object of the present invention is to facilitate the use of a digitizer cursor.

Another object of the present invention is to improve the accuracy of position determinations made by an operator using the cursor.

Another object of the present invention is to improve the accuracy of such position determinations using an accessory that can be easily mounted directly on specially constructed cursors, as well as retrofitted on existing cursors.

Another object of the present invention is to provide an optical element that is readily movable, preferably to a convenient location, out of the operator's line of sight to the cursor's position-sighting aperture to facilitate use of the cursor.

Another object of the present invention is to provide an optical accessory which may completely be removed from the cursor, and preferably which is interchangeable with other optical accessories to permit the operator to select optical components better suited to a particular task.

Another object of the invention is to provide cursor accessories and cursors in which the accessories may easily be mounted to and easily completely removed from the cursors.

Other objects of the invention are to provide accessories and cursors described in the preceding objects of the invention which in use have an aesthetically pleasing appearance and/or have improved ergonomics.

The present invention achieves these and other objects, in various combinations thereof, by movably mounting an accessory on a cursor such that the accessory facilitates and/or improves use of the cursor, is esthetically pleasing and/or improves the ergonomics of the cursor. In the disclosed embodiments, the accessory movably mounts an optical element adjacent the position-sighting aperture. The optical element facilitates and/or improves the accuracy of an operator's position determinations, and the manner of mounting provides an aesthetically pleasing device and improves ergonomics.

The optical element is mounted to the cursor adjacent the position-sighting aperture in optical alignment therewith by cooperating means associated with the optical element and the position-sighting aperture. For example, the position-sighting aperture may be located in a recess which may have a projecting rim surrounding it. That recess cooperates with a recess associated with the optical element to mount the optical element to the cursor. In one embodiment, a member including the optical element is mounted directly to the cursor. In other embodiment, the optical element is mounted to the cursor via another member, e.g., a mounting ring or frame or cradle.

More specifically, in the illustrated embodiments, the optical element is a magnifying lens which may be removed, i.e., separated, preferably in its entirety from the cursor, and is in certain embodiments movably mounted to the cursor so that it may be moved into and out of optical alignment with the position-sighting aperture. Preferably, the mounting is such that different optical elements may be mounted to the same cursor.

According to the illustrated embodiments of the invention, the accessory is mounted to the rim of the position-sighting aperture of either an existing cursor or a cursor according to the invention. In one embodiment, a member including the optical element is mounted directly to the rim. In other embodiment, the optical element is mounted to the rim via the other member referred to above.

In the latter embodiments, the accessory preferably includes first and second cooperating members, one of which cooperates with the cursor and the other of which is connected to the optical element and is movable and/or removable with respect to the one member. The first and second members may be releasably connected to one another, and/or they may be non-releasably connected together and the member which cooperates with the cursor is releasably connected thereto, thereby making the optical element releasably connected to the cursor. Preferably, the member cooperating with the cursor is completely removable from the cursor, but need not be.

In particular embodiments, the member to which the optical element is connected is mounted to be pivoted or swung away from optical alignment with the position-sighting aperture to a convenient location so that the operator may have a direct line of sight thereto. In one embodiment that member is swung substantially parallel to a plane in which the position-sighting aperture extends (i.e., pivots about an axis substantially normal to the plane of the position-sighting aperture). In another embodiment, that member is swung transversely to the plane in which the position-sighting aperture extends (i.e., pivoted along an axis substantially parallel to the plane in which the position-sighting aperture lies).

In particular embodiments of the present invention, one of the members includes at least one mounting projection and the other member includes at least one receptacle or recess for receiving the mounting projection. In one embodiment, the member to which the optical element is connected includes a mounting arm, and the other member cooperating with the cursor includes a receptacle for pivotably receiving the arm. In another embodiment, the member to which the optical element is connected includes a pair of pins, and the other member cooperating with cursor includes a pair of slots for pivotably receiving the pins.

Locking means preferably associated with the respective members releasably lock the optical element in at least one predetermined position, e.g. a viewing position, with respect to the position-sighting aperture of the cursor, while permitting the optical element to be moved out of the predetermined position. Preferably, the second member when moved is frictionally engaged in the position to which it is moved. In one embodiment, the locking means comprises a locking projection on one of the members and a recess on the other member. The locking projection may take the form of a rib extending longitudinally along the mounting projection. In another embodiment, the locking means comprises camming surfaces.

BRIEF DESCRIPTION OF THE DRAWINGS

The features and advantages of the present invention will be more clearly understood when the detailed description of the preferred embodiments provided below is considered in conjunction with the figures, wherein like references denote like or corresponding parts, and in which:

FIG. 9 is an exploded perspective view of the cursor of FIG. 4 to which an accessory according to another embodiment of the invention is mounted; and FIG. 10 is a cross section side view of the cursor and accessory of FIG. 9 taken along line 10—10 thereof, with the lens of the accessory swung up.

DESCRIPTION OF THE PREFERRED EMBODIMENTS

Figure 1:
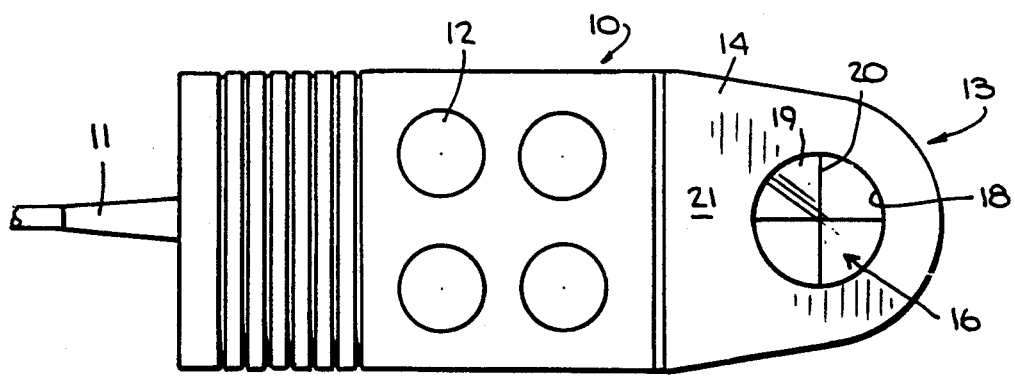
FIG. 1 is a top plan view of an existing cursor.

FIG. 1 shows an existing cursor 10 to which an accessory may be mounted in accordance with the present invention. The cursor 10 is connected to a computer (not shown) by the cable 11. The buttons 12 are used by the operator in a known manner to control the computer's operation. At the front end 13 of cursor 10 is a transparent platform 14 having a position-sighting aperture 16. The aperture 16 is located in a recess which has a rim 18 surrounding an optically-flat sight glass 19 having cross-hairs 20 that are located on or near the bottom surface of the cursor 10. The upper edge of rim 18 is flush with the upper surface 21 of platform 14.

Figure 2:
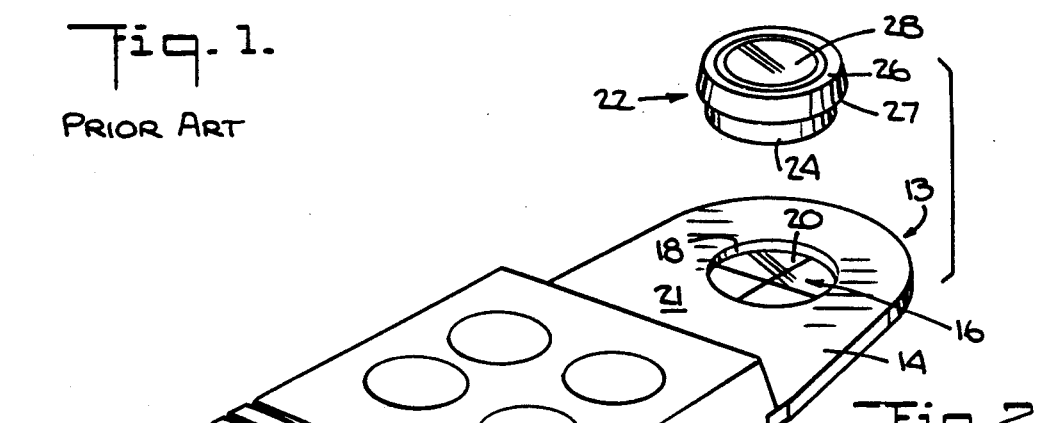
FIG. 2 is an exploded perspective view of an accessory in accordance with the present invention and the cursor of FIG. 1 to which it is mounted.

FIG. 2 shows an accessory 22 in accordance with the present invention having a plug 24 adapted to be received in the recessed position-sighting aperture 16 engaging rim 18 of the cursor platform 14, i.e., the outer periphery of plug 24 snugly engages the inner periphery of rim 18. The plug 24 is connected to a support ring 26 having a shoulder 27 that rests on the upper surface 21 of the platform 14 when the plug 24 is inserted into the aperture 16. Plug 24 defines a peripheral recess with respect to ring 26. The support ring 26 holds a magnifying lens 28 at the proper height above the cross hairs 20 to provide a well-focused image to the operator of the surface of a sheet (not shown) under the cross hairs 20. Accessory 22 may be completely removed from cursor 10 when magnification through the position-sighting aperture 16 is not desired. Plug 24 frictionally engages rim 18. However, other forms of engagement may also be used, e.g., threaded, interference, bayonet, snap, detent, etc.

Figure 3:
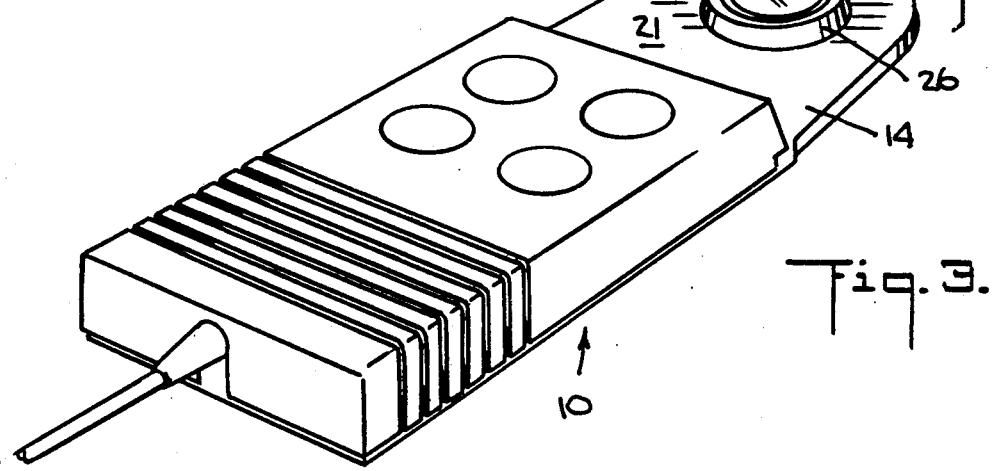
FIG. 3 is an exploded perspective view of the cursor and accessory depicted in FIG. 2 assembled together, to which a second accessory according to the invention is mounted.

FIG. 3 shows another accessory 22a (second member) for use with cursor 10 and accessory 22 (first member) to provide improved positional accuracy determinations for cursor 10 in accordance with the present invention. Accessory 22a comprises a circular flange 26a connected to a small diameter support ring 27 which supports another lens 28a. The bottom of flange 26a rests on the upper surface 21 of platform 14 and defines a recess in which lens 28a is received with the inner periphery of the recess; snugly engages the outer periphery of support ring 26 of accessory 22 with a shoulder of the recess resting on the top of the projecting optical element 22. Lens 28a is a high-speed optical element supported above the lens 28 such that the combination of lenses 28a and 28 provides increased magnification without decreasing the field of view. Accessory 22a may be removed from accessory 22, and both accessories 22a and 22 may be completely removed from cursor 10. The fit of accessories 22 and 22a may be as described for the fit of accessory 22 to rim 18.

The embodiments of FIGS. 2 and 3 permit retrofitting of an existing cursor with accessories.

Figure 4:
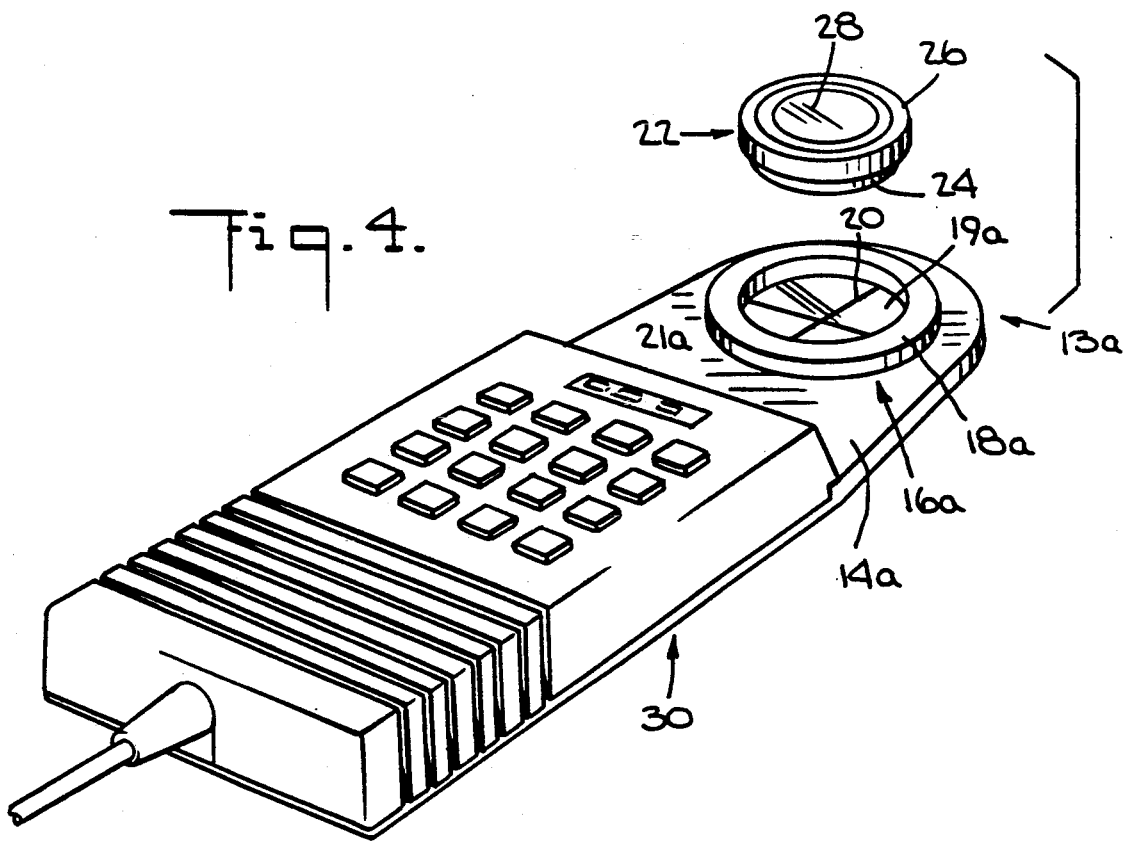
FIG. 4 is an exploded perspective view of a cursor according to the invention having an integral, protruding rim to which an accessory, which may be similar or identical to the one shown in FIG. 2, is mounted.

FIG. 4 shows accessory 22 mounted to a cursor 30 according to the invention instead of to an existing cursor 10 (FIG. 2). Accessory 22 in FIG. 4 may be identical or similar to accessory 22 in FIG. 2. In accordance with the invention, the transparent platform 14a of cursor 30 has an integral rim 18a protruding from the position-sighting aperture 16a above surface 21a so as to recess the position-sighting aperture 16a''. The cross-hairs 20 seen through the aperture 16a are affixed to an optically-flat sight glass 19a on or near the bottom surface of the cursor 30. Plug 24 is received in rim 18a, for example as described above for rim 18, and the bottom of support ring 26 rests on the upper surface of rim 18a, rather than directly on upper surface 21a of the platform 14a as in the embodiment of FIG. 2.

Figure 5:
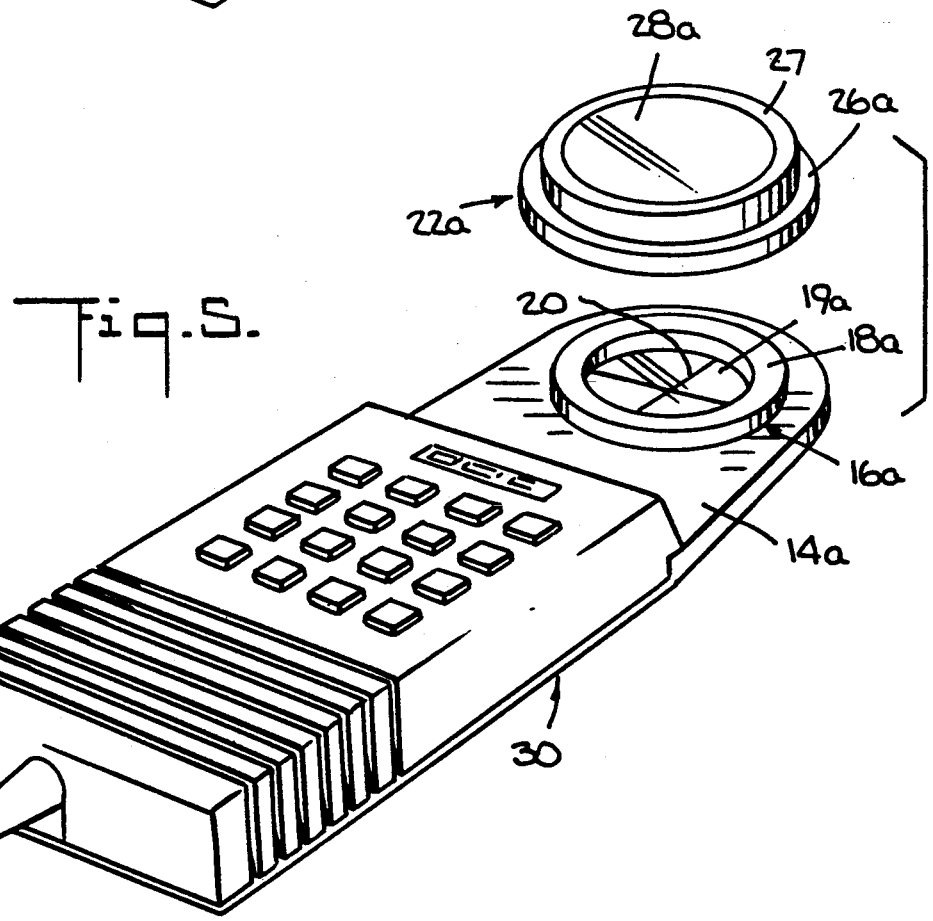
FIG. 5 is an exploded perspective view of the cursor depicted in FIG. 4 to which an accessory, which may be similar or identical to the one shown in FIG. 3, is mounted.

In the embodiment of FIG. 5, accessory 22a may be mounted directly to the aperture 16a, cooperating with the rim 18a, and does not require accessory 22 used in the embodiment of FIG. 3. Accessory 22a in FIG. 5 may be identical or similar to accessory 22a in FIG. 3. The inner periphery of flange 26a of the recess defined by accessory 22a surrounds and snugly engages the outer periphery of rim 18a. Engagement may be as described above for accessory 22 and accessory 22a.

In the embodiments depicted in FIGS. 2, 4 and 5, accessories 22 and 22a are mounted directly to cursor 10 or 30, and may be completely removed when desired. In the embodiment of FIG. 3, accessory 22a is mounted to cursor 30 via accessory 22, both being removable as desired.

Figure 6:
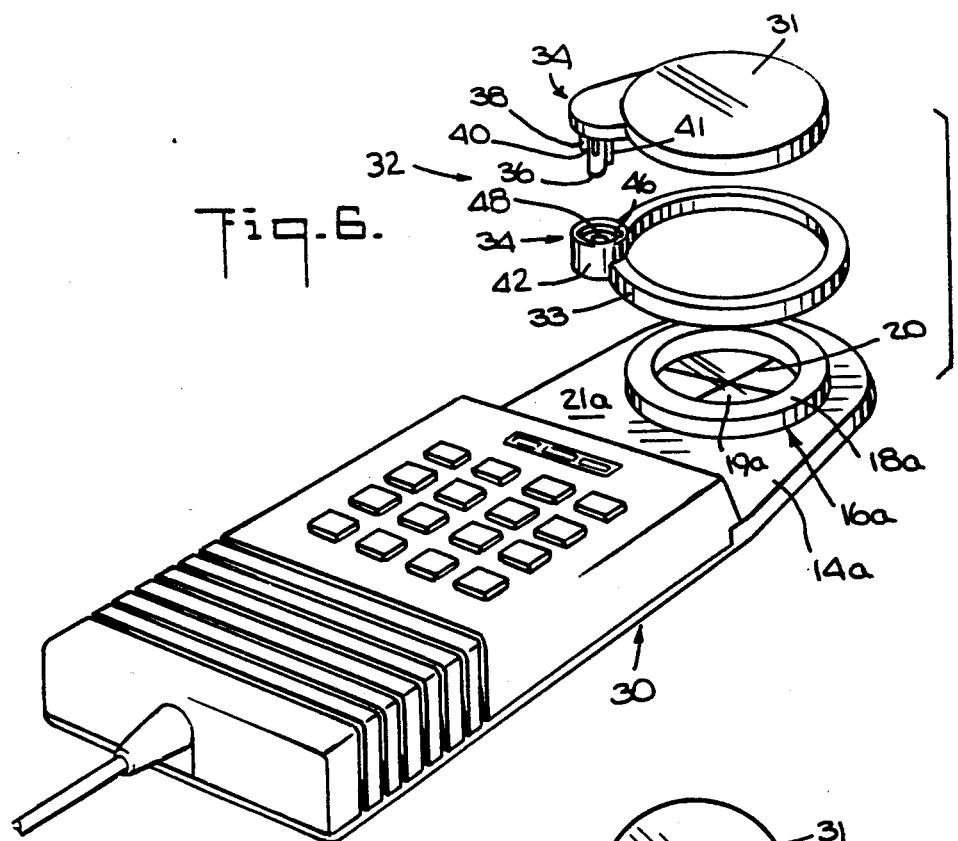
FIG. 6 is an exploded perspective view of the cursor of FIG. 4 to which an accessory according to another embodiment of the present invention is mounted.

FIG. 6 shows an embodiment of the present invention in which the optical element 31 of an accessory 32 may be moved, e.g., swung, away from sighting aperture 16a of cursor 30 into a convenient position which does not substantially interfere with the operator's use of cursor 30. Thus, optical element 31 is movably mounted to cursor 30, and may remain mounted to cursor 30 both when it is being used and when the operator does not want to use it. The accessory 32 shown in FIG. 6 comprises a mounting ring or frame 33 (first member) and a pivot assembly 34 associated with optical element 31 (second member) and mounting ring 33. The mounting ring 33 is removably secured to the rim 18a to removably hold the accessory 32 on the cursor 30. Specifically, the inner periphery of mounting ring 33 defines a recess which surrounds and snugly frictionally engages the outer periphery of rim 18a. Engagement may be by the engaging forms described above. The pivot assembly 34 includes pivot post or arm 36 having ribs 38, 41 that extend axially part way along the post 36 and radially outwardly, terminating in respective outer surfaces 40. Rib 41 is a key rib that extends radially farther out from the post 36 than the other ribs 38. Pivot assembly 34 also includes a pivot cup or receptacle 42 connected to mounting ring 33. Cup 42 has a central aperture 44 that receives the pivot post 36 therein. The pivot cup 42 also has a notch 46 that cooperates with key rib 41 and the outer surface 40 of the ribs 38 so that when the lens 31 is centered over the cross hairs 20, the key rib 41 is received in the notch 46 which permits the post 36 to fully seat in the pivot cup 42, as shown in phantom in FIG. 8. Thus, a key rib 41 and notch 46 function similar to a spline connection, which however permits relative rotation when rib 41 is lifted out of the notch 46, as described more fully below.

Preferably, post 36 is integrally mounded with lens 31 to form a unitary piece (second member), and cup 42 is integrally mounded with mounting ring 33 to form a unitary piece (first member).

When the post 36 is fully seated in the pivot cup 42, the outer surface 40 of the ribs 38 rests against the inner periphery of aperture 44. When post 40 is lifted to the solid line position depicted in FIG. 8, it may be rotated. Rib 41 is flexible and upon exiting notch 46 slightly flexes and rides along the inner periphery of central aperture 44. Thus, key rib 41 engages the inner peripheral surface of central aperture 44 when lens 31 is not in the viewing position such that lens 31 remains in the position it is moved into. This arrangement releasably locks the lens 31 in the viewing (predetermined) position shown in phantom FIGS. 7 and 8. A camming arrangement (not shown) may be used to lift rib 41 out of notch 46.

Figure 7:
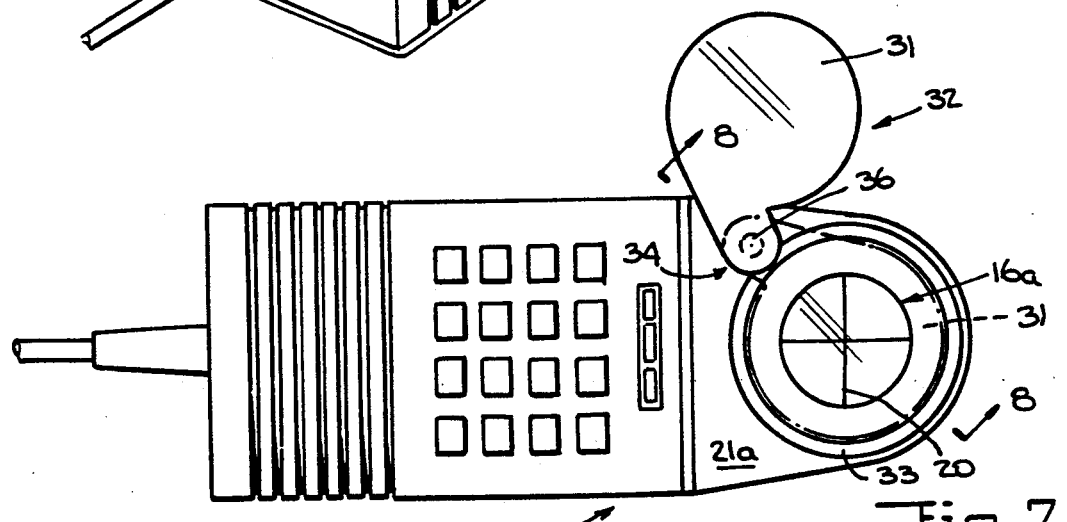
FIG. 7 is a top plan view of the cursor and accessory of FIG. 6 depicting the optical element of the accessory swung away from its viewing position, and showing the optical element in phantom in its viewing position.
Figure 8:
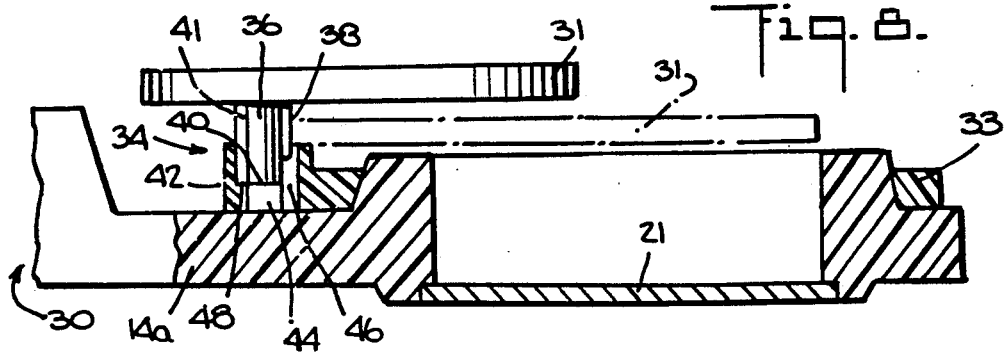
FIG. 8 is a cross section view of the cursor and accessory of FIG. 7 taken along line 8—8 thereof.

In the embodiment depicted in FIGS. 6–8, lens 31 is swung in a plane parallel to the plane of position-sighting aperture 16a and the plane of cross-hairs 20, i.e., swung along an axis perpendicular to the plane of cross-hairs 20. In the embodiment of FIGS. 9–10, lens 50 is swung normal to the plane of position-sighting aperture 16a and the plane of cross-hairs 20, i.e., swung along an axis parallel to the plane of cross-hairs 20.

Accessory 52 depicted in FIGS. 9 and 10 is mounted to rim 18a of cursor 30 and includes a mounting ring, frame or cradle 33a (first member) and a lens mount 54 (second member) which incorporates lens 50. Lens mount 54 is formed integrally with lens 50 and a lift tab 58. Lens 50 is held in position above the cross-hairs 20 by cooperation of the lift tab 58 on lens mount 54 and a pivot assembly 60 associated with lens mount 54 and cradle 33a. Pivot assembly 60 includes two pivot pins or posts 61, 62 extending from a projecting tab 63 parallel to a tangent of the lens mount 54 at a periphery of the lens mount 54 opposite tab 58. Tab 63 and posts 61 and 62 are formed integrally with lens mount 54. Pivot assembly 60 also includes recesses 64, 66 on the periphery of cradle 33a. Posts 61 and 62 are pivotably received in recesses 64, 66 when the cradle 33a is mounted around the rim 18a of the position-sighting aperture 16a as described above for mounting ring 33. Tab 58 of lens 50, when lens 50 is seated in its viewing position depicted in phantom in FIG. 10, is seated in gap 67 of mounting ring 33a. If desired, lens mount 54 may be provided as a split ring, and lens 50 may be provided as a separate piece which is held by the split ring.

The pivot assembly portion 60 associated with lens mount 54 includes a surface 68 (FIG. 10) contoured to form, in cooperation with upper surface 21a of platform 14a, stops to hold lens mount 54 in the solid-line upright and phantom viewing positions depicted in FIG. 10. Contoured surface 68 includes a curved (e.g. radiused) portion 69 with straight portions 70, 71 on both sides thereof. Straight portion 70 cooperates with upper surface 21a of platform 14a to form a stop for lens mount 54 in the upright position thereof depicted in solid lines in FIG. 10, and straight portion 71 cooperates with upper surface 21a and with tab 58 forms a stop for lens mount 54 in the horizontal, viewing position thereof depicted in phantom in FIG. 10. Curved portion 69 facilitates pivoting between the upright and viewing positions. Lens mount 54 when pivoted further counter-clockwise from the solid line position of FIG. 10 lifts cradle 33a to facilitate disassembly of lens mount 54 from cradle 33a and removal thereof from cursor 30.

As in the embodiment of FIGS. 6-8, cradle 33a and lens mount 54 may be completely removed from the cursor 30. Thus, in all of the illustrated embodiments all accessory parts may be completely removed from the respective cursor.

Although the invention has been described with particular reference to presently preferred embodiments, it will be apparent to one skilled in the art that other variations, as well as modifications thereof, can be made within the spirit and scope of this invention. For example, snap, bayonet, screw, detent, etc. mountings might be provided for the accessory. Also, the accessories may be used with different type cursors, e.g., electromagnetic, capacitance, optical, sonic, etc. If desired, the various illustrated embodiments may be combined to provide additional accessories similar to those depicted. Moreover, various optical elements in various combinations may be mounted by the accessories described, including lenses of various powers, filters, lights, etc.

It is to be understood that the drawings and descriptions herein are proffered by way of example, to facilitate comprehension of the invention, and should not be construed to limit the scope thereof.

What is claimed is:

1. The combination of a digitizer cursor and an accessory for use therewith, said digitizer cursor having a recess and a position-sighting aperture in said recess, said accessory comprising an optical element having a peripheral recess adjacent an end thereof and a peripheral shoulder adjacent said peripheral recess, said peripheral recess and said shoulder being sized and configured such that said end of said optical element may be removably inserted into said recess with said shoulder in contact with said cursor adjacent said recess.

2. The combination of claim 1 wherein a rim of said recess surrounds said position-sighting aperture and projects from said cursor adjacent said position-sighting aperture.

3. The combination of claim 1 further comprising another optical element and means associated with said another optical element and with said optical element for removably mounting said another optical element to said cursor in optical alignment with said optical element.

* * * * *